US007640319B1

United States Patent
Sylvain et al.

(10) Patent No.: US 7,640,319 B1
(45) Date of Patent: Dec. 29, 2009

(54) GATEWAY SHARED BY MULTIPLE VIRTUAL PRIVATE NETWORKS

(75) Inventors: Dany Sylvain, Gatineau (CA); Scott Larrigan, Ottawa (CA)

(73) Assignee: Nortel Networks Limited, St. Laurent, Ontario (CA)

( * ) Notice: Subject to any disclaimer, the term of this patent is extended or adjusted under 35 U.S.C. 154(b) by 723 days.

(21) Appl. No.: 10/675,063

(22) Filed: Sep. 30, 2003

(51) Int. Cl.
*G06F 15/16* (2006.01)

(52) U.S. Cl. .................................. 709/218; 709/245

(58) Field of Classification Search ............... 709/218, 709/216–219, 238–245
See application file for complete search history.

(56) References Cited

U.S. PATENT DOCUMENTS

| | | | | |
|---|---|---|---|---|
| 5,623,601 | A * | 4/1997 | Vu | 726/12 |
| 6,493,349 | B1 * | 12/2002 | Casey | 370/409 |
| 6,832,322 | B1 * | 12/2004 | Boden et al. | 726/15 |
| 7,085,270 | B2 * | 8/2006 | Inouchi et al. | 370/392 |
| 7,107,614 | B1 * | 9/2006 | Boden et al. | 726/15 |
| 7,143,188 | B2 * | 11/2006 | Maufer et al. | 709/245 |
| 7,155,740 | B2 * | 12/2006 | Brustoloni | 726/15 |
| 7,454,525 | B1 * | 11/2008 | Sethi | 709/245 |

OTHER PUBLICATIONS

SonicWall, SonicOS Standard 2.2 Administrator's Guide, 2002, SonicWall, All Pages.*
SonicWall, Tech Note, Sep. 2005, SonicWall.*

* cited by examiner

*Primary Examiner*—Yasin M Barqadle
(74) *Attorney, Agent, or Firm*—Barnes & Thornburg LLP

(57) ABSTRACT

A VPN gateway for interfacing two or more VPNs to external networks such as the internet or a PSTN having different addressing schemes, has a NAT shared by the VPNs for converting VPN addresses to addresses of the external network. An advantage of this is reduced number of additional network elements, e.g. boxes, and fewer additional addresses. The NAT can be a source and destination NAT, arranged such that entities in the external networks appear to have an address within an address range of the respective VPN. Thus, entities in the external resource can appear as trusted resources inside the VPN. The gateway can incorporate a converter for converting between formats such as VoIP packets and TDM calls.

12 Claims, 6 Drawing Sheets

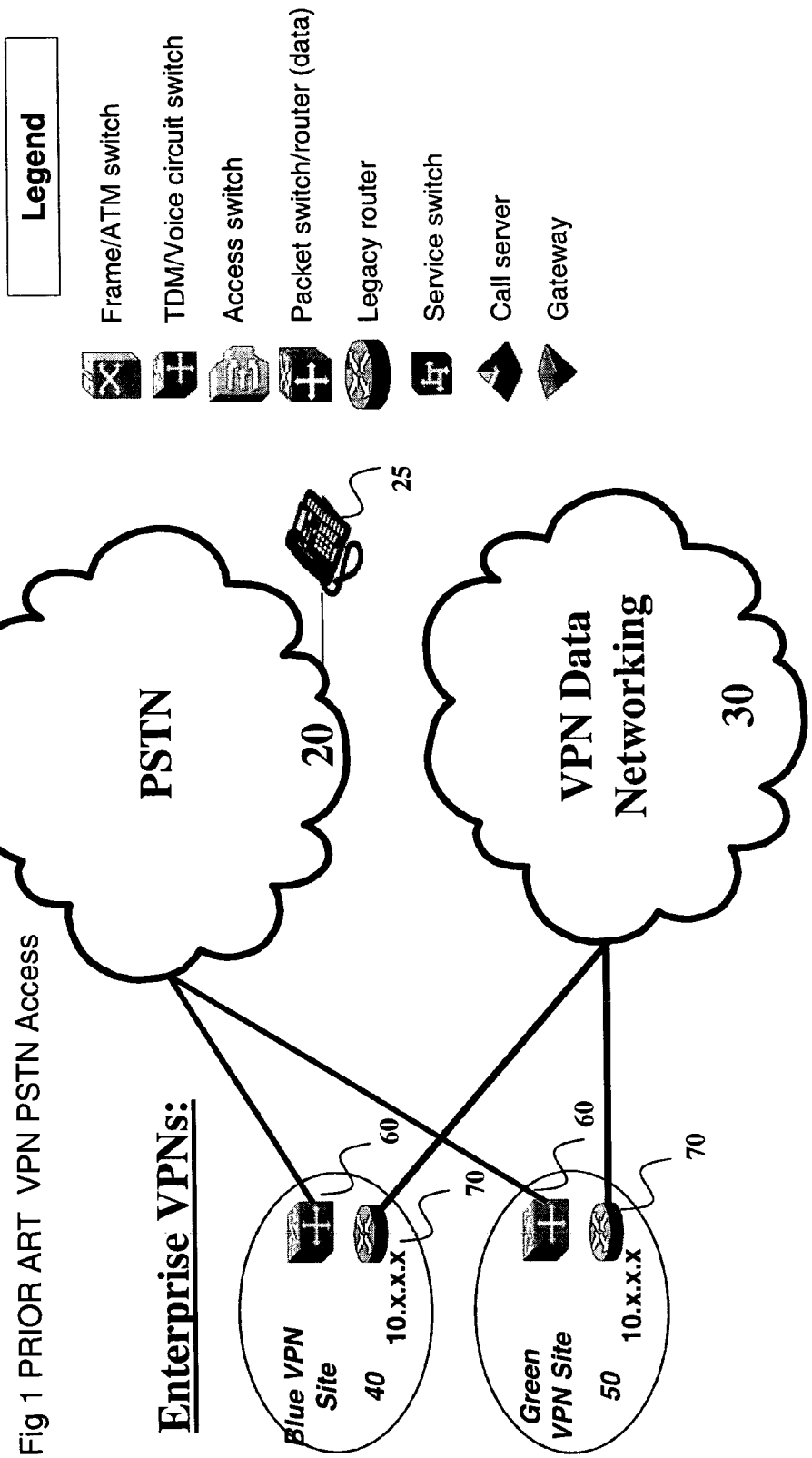

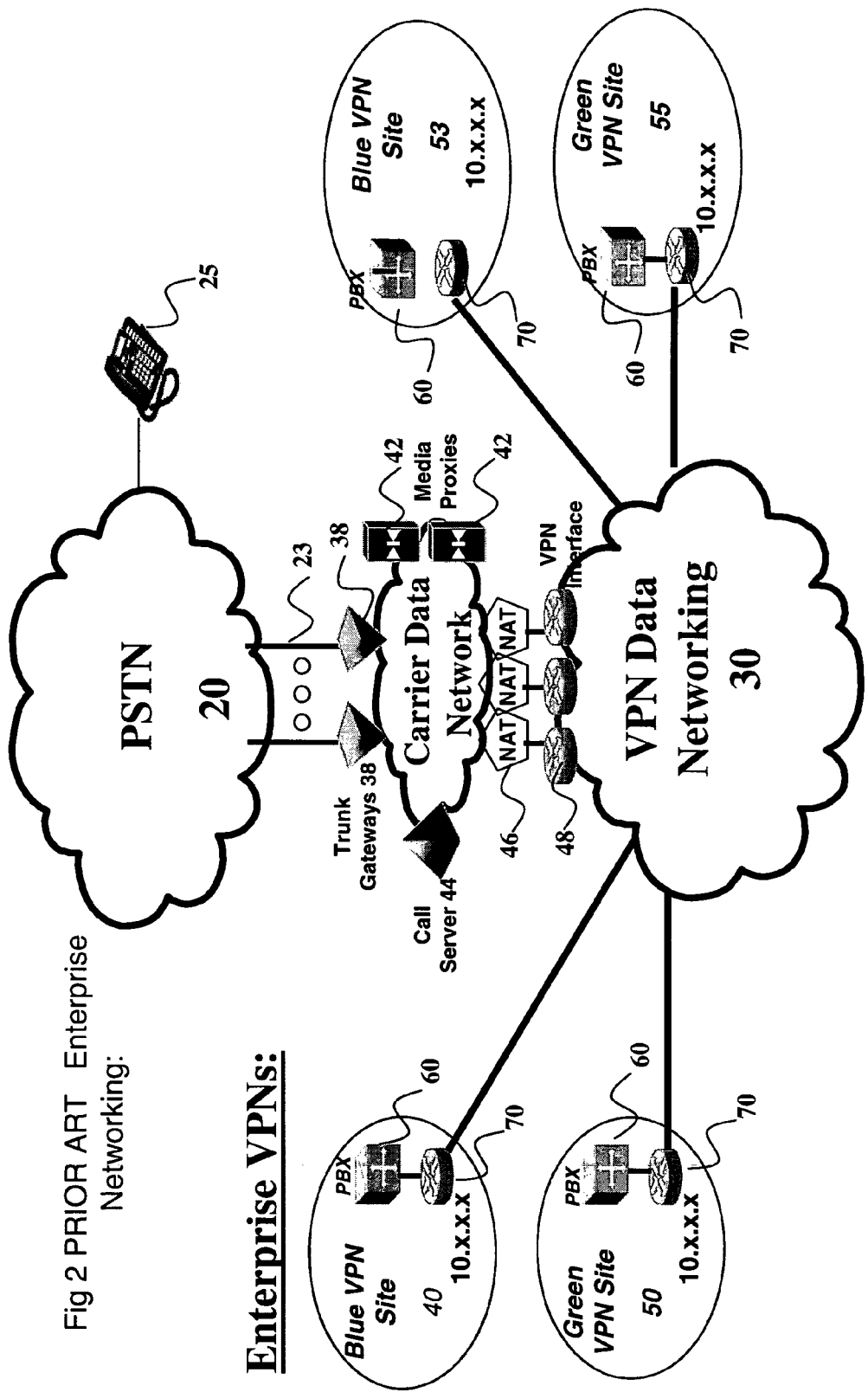
Fig 2 PRIOR ART Enterprise Networking:

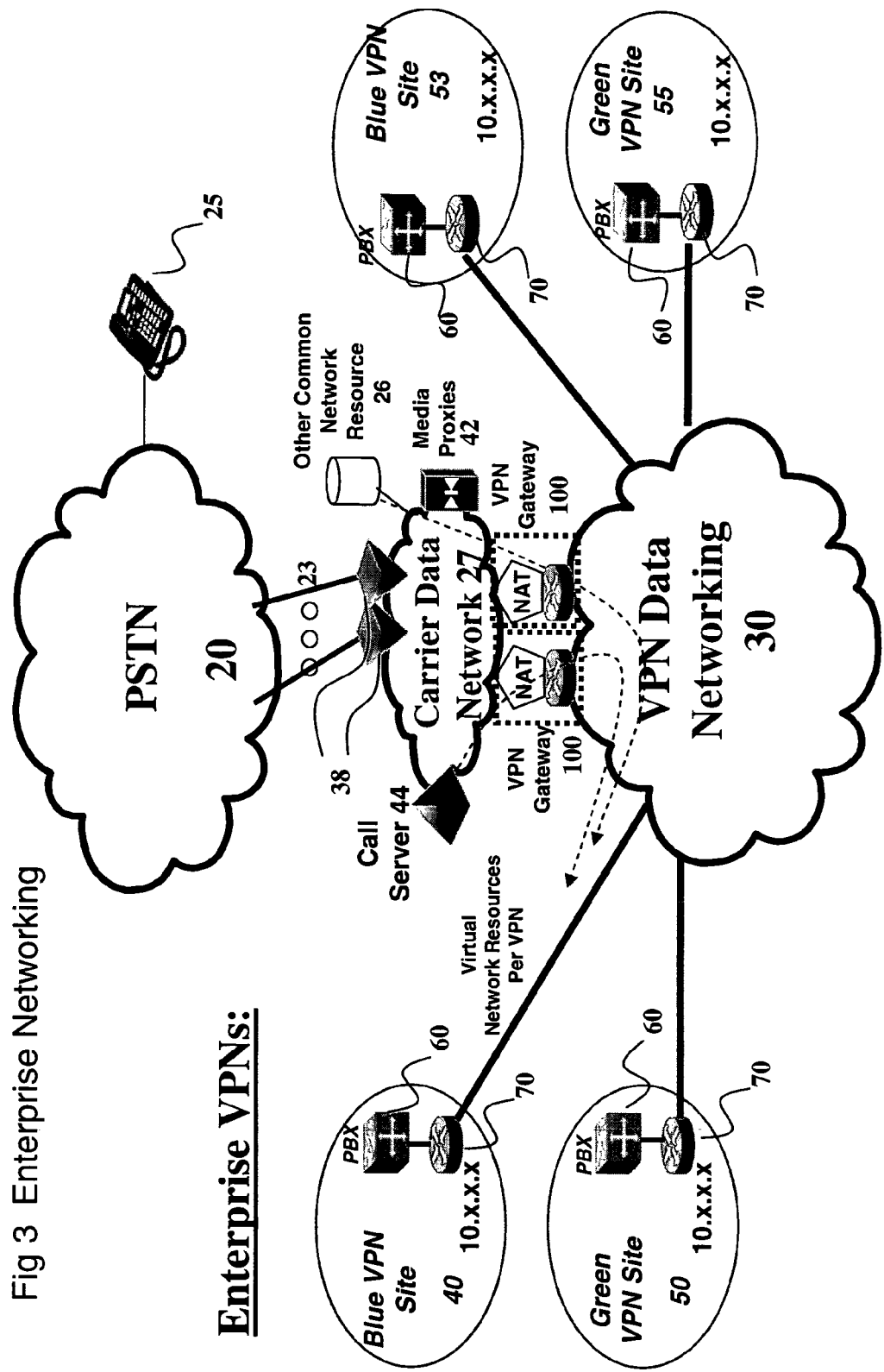
Fig 3 Enterprise Networking

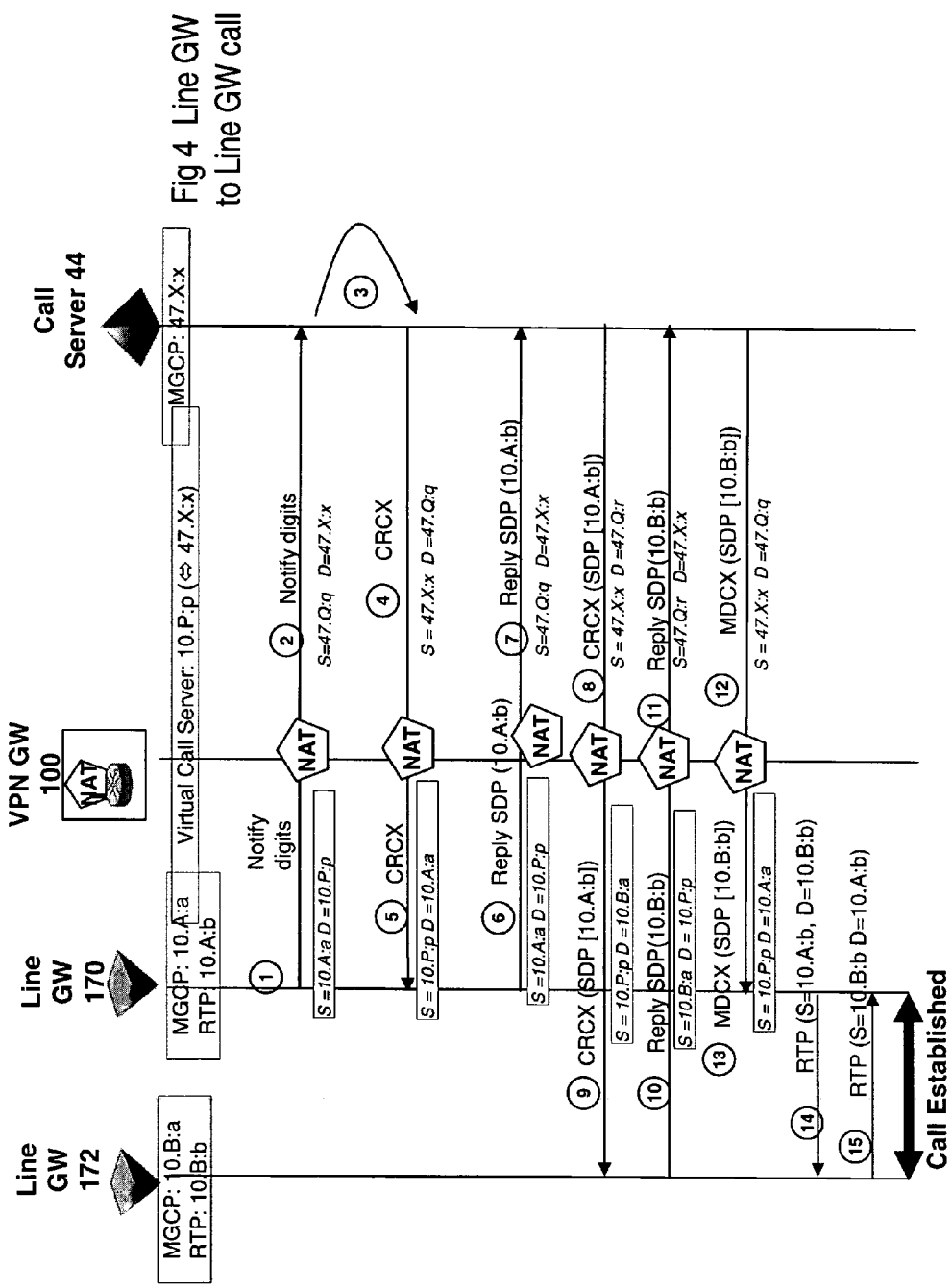
Fig 4 Line GW to Line GW call

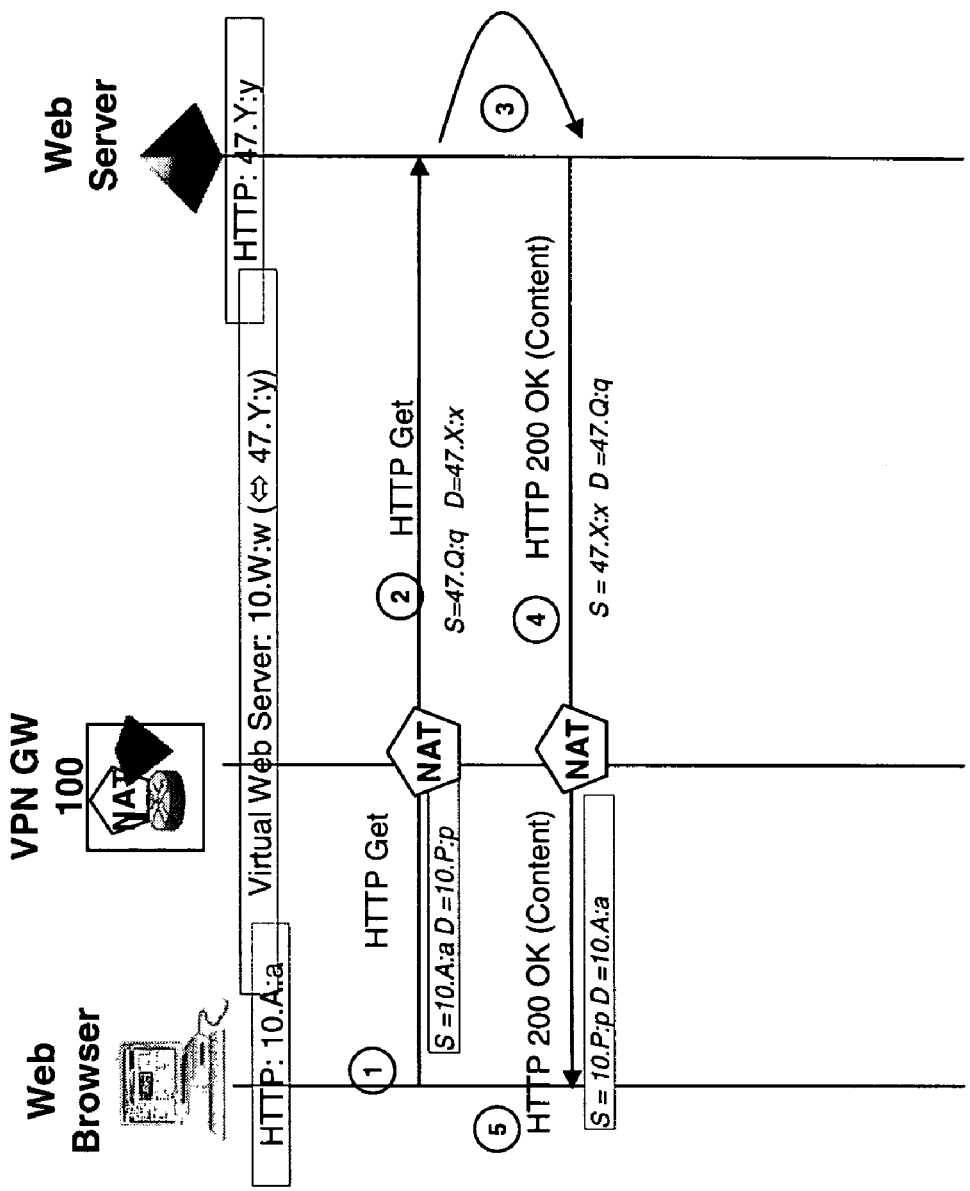

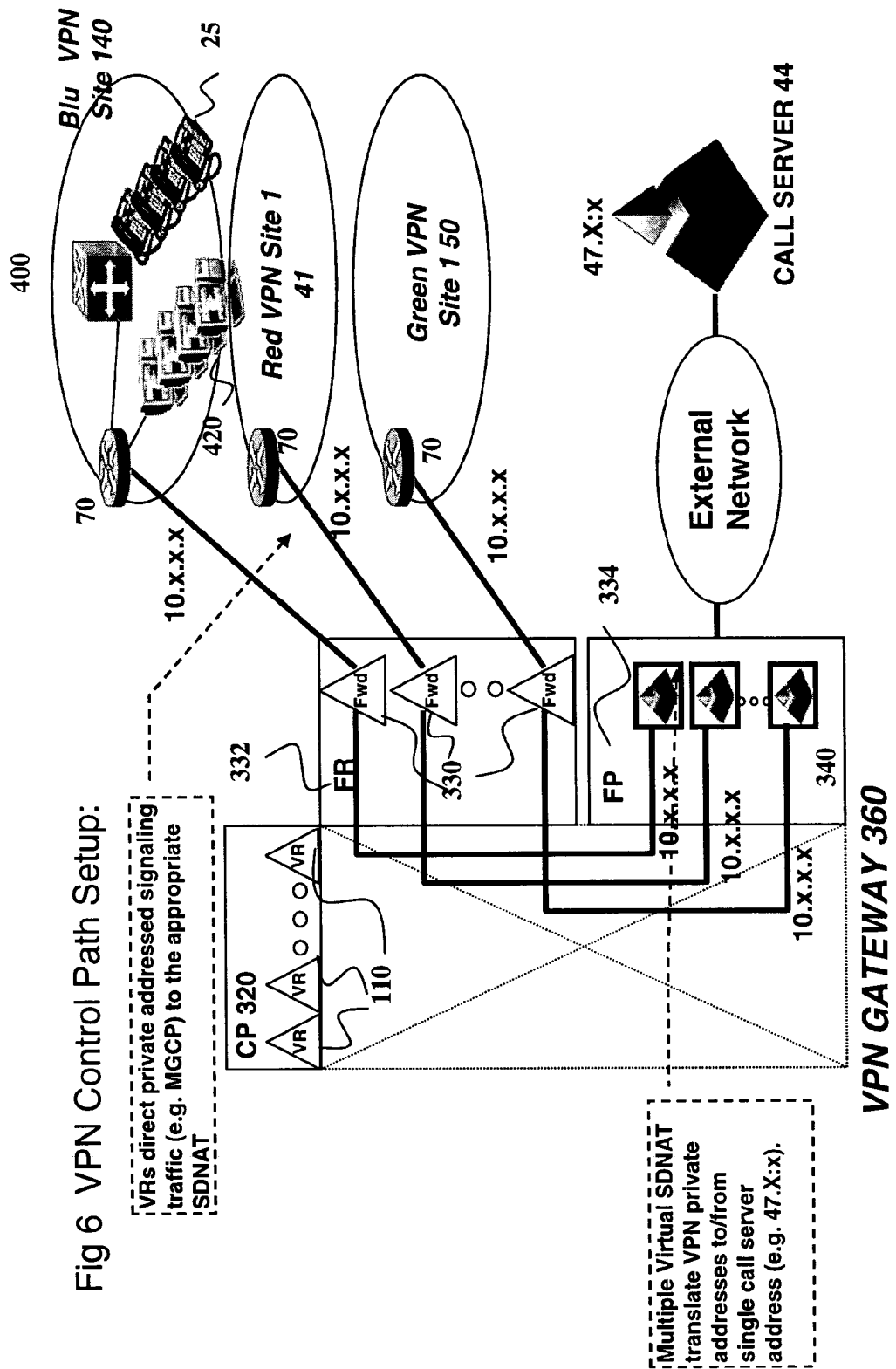

GATEWAY SHARED BY MULTIPLE VIRTUAL PRIVATE NETWORKS

RELATED APPLICATIONS

This invention relates to U.S. patent application Ser. Nos. 10/675,162 and 10/675,645 now U.S. Pat. No. 7,593,388 entitled "Convertor shared by multiple virtual private networks" and "Media proxy having interface to multiple virtual private networks" of even filing date, and hereby incorporated by reference.

FIELD OF THE INVENTION

This invention relates to VPN gateways for interfacing two or more VPNs (Virtual private networks or virtual packet networks), to methods and software for such apparatus, and to methods of offering a VPN service over such apparatus.

BACKGROUND TO THE INVENTION

A broad definition of a VPN is 'any network built upon a public network and partitioned for use by individual customers'. This results in public frame relay, X.25, and ATM networks being considered as VPNs. These types of VPNs are generically referred to as Layer 2 VPNs. Another form of VPNs are networks constructed across shared IP backbones, referred to as 'IP VPNs' or Internet VPNs. IP VPNs are provided typically using well engineered and protected IP networks. One popular type of VPN is described in RFC 2547 as published by the Internet Engineering Task Force. On the other hand, Internet VPN uses the open, distributed infrastructure of the Internet to transmit data between corporate sites. Companies using an Internet VPN set up connections to the local connection points (called points-of-presence [POPs]) of their Internet service provider (ISP) and let the ISP ensure that the data is transmitted to the appropriate destinations via the Internet, leaving the rest of the connectivity details to the ISP's network and the Internet infrastructure. Because the Internet is a public network with open transmission of most data, Internet-based VPNs may include measures for encrypting data passed between VPN sites, which protects the data against eavesdropping and tampering by unauthorized parties. Business uses of VPNs include Remote Access, Site-to-Site links and Extranets References to VPNs are intended to encompass networks with their own private or non private addressing plan, using shared resources such as call servers or gateways.

If such VPNs are offered as a service by a service provider such as telecoms carrier organizations, they will typically be arranged to have security gateways. Security gateways sit between public and private networks, preventing unauthorized intrusions into the private network. They may also provide tunneling capabilities and encrypt private data before it is transmitted on the public network. In general, a security gateway for a VPN can be implemented as part of a router, or of a firewall, or of integrated VPN hardware, or of VPN software. A security gateway also frequently includes network address translators (NAT). The NAT provides two key functions. First, it allows the enterprise to use a private IP addressing numbering plan (such as 10.x.x.x), frequently needed due to the scarceness of IP addresses with IPv4. Secondly, NAT adds another layer of security as it effectively hides the address of devices in the enterprise and blocks any unsolicited attempt to connect with them from the public network. Unfortunately, NAT has the side effect of modifying the IP address and port address of devices in the private network when they communicate with the public network. As is well known, a number of protocols running above the IP layers, such as call processing (e.g. ITU H.248, ITU H.323, IETF MGCP (Media Gateway Control Protocol) (RFC 3435)) and voice transport protocols (e.g. IETF RTP (RFC 1889)) are disrupted by this address translation. A number of techniques have been implemented to get around the NAT problem but all have some form of drawbacks, in term of equipment cost or configuration complexities. The IETF Midcom (Middlebox Communication) working group has proposed two pre-midcom solutions: First, Media Proxies can be inserted into the call, which will be described below, with reference to FIG. 2. However they are costly additional hardware, and may not be on the natural path of the media resulting in media triangulation problems and added delay. Alternatively, the STUN protocol can be used by the gateway, but this results in all calls being public and negates the other advantages of using the VPNs for such traffic. STUN is the Simplified Traversal for UDP NAT as defined by the IETF—RFC 3489 on STUN—Simple Traversal of User Datagram Protocol (UDP) Through Network Address Translators (NATs). This invention addresses such problems and the additional complexities of network configuration and equipment that they can cause.

FIG. 1 shows how enterprises typically use VPNs today. Enterprises have multiple sites that need to be interconnected for data traffic. By subscribing to a VPN service from a public carrier, they do not need to setup dedicated point to point transmission circuits such as DS1 or E1 between each sites. Instead, they interconnect at the edge of the public carrier's network using one transmission circuit and from there, the carrier's VPN equipment routes the traffic to the proper end point (other sites for the same enterprise) which are similarly attached to the carrier's VPN network. In this example, all voice traffic, either going to the PSTN (public service telephone network) or going to other enterprise sites is handled separately. In FIG. 1, a VPN data networking environment 30 is provided by a service provider for a number of enterprises. Two examples are shown, a "blue" VPN site 40, and a "green" VPN site 50. The green enterprise uses the private 10.x.x.x address range and similarly, the green VPN uses the overlapping private 10.x.x.x address range. In practice, each VPN would have multiple sites, only one is shown for each VPN. Each site has a router 70 for routing IP packet to the VPN data networking environment, which can be the public internet or private networks. Each site has a PBX 60, coupled to the PSTN 20, to reach a generic destination phone 25.

It is known to use a VPN not only for data traffic but also for voice traffic. The advantage of this is that it can reduce the expense and equipment otherwise needed for handling those types of traffic separately. An example is shown in FIG. 2. FIG. 2 shows a known example in which voice traffic is carried over the VPN to reach the PSTN 20. Corresponding reference numerals to those of FIG. 1 have been used where appropriate. The TDM/voice circuit switch 60, typically in the form of a (private branch exchange) is now coupled to the VPN router 70 at each of the VPN sites. Inter-site voice traffic can stay within the enterprise VPN but a means to access the PSTN is needed. This is implemented by means of trunk gateways 38 for coupling PSTN trunks 23 to a carrier data network 27. The carrier data network is coupled to each of the VPNs in the data networking environment by one or multiple NATs 46 (network address translator) and VPN interface routers 48. The carrier data network 27 includes one or multiple call servers 44 for controlling the call and handling signaling packets. The carrier data network 27 also includes media proxies 42 to get around the NAT problem described earlier. The operation of such an arrangement will now be summarized.

Calls originate from the enterprise users connected to a telephony switch, typically a local PBX, and then go through a conversion to VoIP (Voice over IP) form, either via a media gateway inside the PBX itself or via an external media gateway. Instead of being routed over the public service telephone network (PSTN), the VoIP traffic is merged with the data traffic at the local VPN router 70. If the call is to another enterprise site connected in similar fashion to the VPN, then the VoIP traffic simply flows from site to site along with the data traffic. However, if the call is to be between a VPN site and a user on the PSTN, then the VoIP traffic needs to exit the VPN confines. This is typically done by interworking the enterprise VPN with the carrier data network where the equipment needed to interface to the PSTN reside. The interworking can be done a number of ways and may involve multiple interconnection points depending on the size of the network, but would in most cases involve going through a NAT. The NAT is needed to allow the devices in the enterprise using the enterprise IP addresses (frequently using the reserved IP private address range 10.x.x.x) to establish communication with the devices in the carrier data network using its own IP addressing scheme, using either public or private IP addressing. The PBX 60 and associated media gateway communicate with the call server 44 to establish calls to the PSTN. The call server 44 selects one trunk gateway 38 to complete the call to the PSTN. Because of the NAT, the call server cannot simply provide the enterprise media gateway and the trunk gateway with each others respective IP addresses and let the gateways send VoIP packets to each other as would normally be the case. The IP addresses for each gateway are corrupted by the NAT operation. To get around this problem, the call server 44 can put in the call path specialized media proxies 42 whose operation allows both gateways to communicate with each other. The call server 42 instructs the enterprise media gateway and the trunk gateway to send their packets to the media proxy 42. Essentially the media proxy 42 patches together the VoIP flow coming from the enterprise media gateway and the trunk gateway, as instructed by the call server 44 by learning the translated IP addresses from VoIP packets sent to it. Multiple enterprise VPNs can be interconnected to the carrier data network in similar fashion and share the infrastructure needed to access the PSTN.

These complex addressing arrangements allow the central call server of the service provider to provide services for VoIP end points connected into a number of VPNs. They add considerable complexity and cost in terms of capital expenditure and running costs. Such costs escalate rapidly as the number of VPNs increases.

SUMMARY OF INVENTION

It is an object of the present invention to provide improved apparatus and methods. According to a first aspect of the present invention, there is provided:

A VPN gateway for interfacing two or more VPNs to one or more external networks, the external network or networks having different addressing schemes to those of the VPNs, the VPN gateway having a NAT shared by the VPNs for converting VPN addresses of entities within the VPNs to addresses of the external network.

An advantage of this is reduced cost since as the number of VPNs increases, the cost of additional network elements, e.g. equipment shelves, and additional addresses for additional gateways, can be reduced or avoided, and there can be enhanced use of spare capacity in the external network if the gateway enables a multiplexed interface of the external network to be shared by several VPNs. For software implementations there can be a reduction in the number of software modules and thus lower memory requirements and reduced complexity. This can reduce or avoid using addresses in the address space of the service provider's network, and can simplify security. The external network can be another packet network or a TDM based network or combinations for example.

An additional feature for a dependent claim is the NAT comprising a source and destination NAT, arranged such that entities in the external networks appear to one of the VPNs to have an address within an address range of the respective VPN.

An advantage of this is simplification of the addressing and firewall configuration for the VPN as the specific entities in the external resource can appear as trusted resources inside the VPN.

An additional feature for a dependent claim is the entities in the external networks comprising at least one of: a call server, a SIP proxy, a web server, a storage server, a video server, a mail server, an H.323 gateway, a telephony client, and a telephony media gateway.

An advantage is that since these are examples of entities that are in widespread use commercially, there is more benefit to be gained from the use of a VPN gateway with such entities. In each case such entities can remain outside the VPNs and thus be managed independently of any one VPN, yet can be shared between multiple VPNs.

Another additional feature is the external network address used for each VPN entity being unique in the corresponding external network.

This can enable the external entities to communicate with the VPN entities with less or no risk of ambiguity or confusion since the external addresses are unique.

Another additional feature is the VPN gateway having physical or logical interface ports, and being arranged to determine an identity of each of the VPNs based on which physical or logical interface port on the VPN gateway is used to couple the respective VPN.

This is a practical way of enabling differentiation of the VPNs without undue complexity.

Another additional feature is the VPNs each comprising a part of an Internet Protocol (IP) network.

An advantage of support of the currently most prevalent data network type is that more existing and future VPNs can be interfaced.

Another additional feature is the multiple VPNs using overlapping private IP addressing schemes.

An advantage of this is that each VPN can arrange their IP addressing independently, without having to worry about the configuration of other VPNs.

Another additional feature is the VPN gateway being arranged to provide protocol conversion.

This can enable the multiple VPNs and the external network to use different versions of the IP protocol. An advantage of this is that it helps enable a progressive transition to for example IPv6 by allowing each VPN and network to use different addressing mode, rather than requiring an upgrade of all networks simultaneously. The NAT can be arranged to provide the protocol type conversion.

Another additional feature is the VPNs being arranged to use at least one of ATM, Frame Relay, MPLS or IP.

An advantage is that these are commonly used for all or part of existing VPNs so it is commercially significant to be able to handle such formats.

Another additional feature is the VPN gateway being arranged to couple communication sessions having one end in one of the VPNs and another end in the external network, the sessions being controlled by a communication server.

An advantage is that such sessions are likely to be a significant part of the information flows and having the gateway handling them efficiently can reduce costs if the number of entities or boxes can be reduced.

Another additional feature is the communication sessions being one of data sessions, telephony calls, or video calls.

Another additional feature is the VPN gateway being arranged to communicate to the external network entities the VPN identity associated with a given communication session.

An advantage of this is that for certain applications, the external entity may be simplified if it can query the VPN gateway to identify the VPN identity for a given communication session, instead of having to discover it based only on the external address presented by the VPN gateway for the internal VPN entity.

Another aspect provides a method of using a VPN gateway to interface two or more VPNs to one or more external networks, the external network or networks having different addressing schemes to those of the VPNs, the VPN gateway having a NAT, the method having the steps of passing information between any of the VPNs and the one or more external networks, and converting VPN addresses of entities within the VPNs to addresses of the external network.

Another aspect provides a method of using a NAT shared by two or more VPNs to communicate between one of the VPNs and an entity of an external network or networks having different addressing schemes to those of the respective VPN, comprising the steps of receiving addresses and translating the addresses such that entities in the external networks appear to the respective VPN to have an address within an address range of the respective VPN.

Another aspect provides a method of offering a virtual packet network service using the VPN gateway.

The advantages of the apparatus can feed through to enable improvements to be made in the services using the apparatus, and the value of such services can increase. Such increased value over the life of the system, could prove far greater than the sales value of the equipment.

Another aspect provides a node for a network, the node having a VPN gateway as set out above.

Another aspect provides:

software for carrying out the methods. This acknowledges that software can be a valuable, separately tradable commodity. It is intended to encompass software, which runs on or controls "dumb" or standard hardware, to carry out the desired functions, (and therefore the software essentially defines the functions of the gateway, and can therefore be termed a gateway, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Another aspect provides a sequence of signals comprising a signal from an entity of one of the VPNs, addressed to an entity in the external network which appears to have an address within the address range of the respective VPN, and a signal returned from the entity in the external network, and routed by the VPN gateway back to the entity in the respective VPN. As an additional feature, the sequence further comprises a signal from the VPN gateway to the entity in the external network containing an identity of the respective VPN.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which:

FIG. 1 shows a known arrangement of VPNs with separate voice and data networks,

FIG. 2 shows another known arrangement of VPNs with the PSTN coupled to the VPNs, FIG. 3 shows VPNs sharing a VPN gateway according to a first embodiment of the invention, FIG. 4 shows another embodiment in the form of a sequence chart of call set up via the VPN gateway using a call server, FIG. 5 shows another embodiment in the form of a sequence chart for web server access via the VPN gateway, and FIG. 6 shows an embodiment of a VPN gateway.

DETAILED DESCRIPTION OF EMBODIMENTS

FIG. 3, Embodiment of VPN Gateway

FIG. 3 shows a first embodiment of the invention. As in FIG. 2, voice traffic is handled by the VPN data networking environment. A simplified interface between this environment, having a number of VPNs, and external networks including the PSTN 20, is provided by the VPN gateways 100. In this example, the external networks are exemplified by the carrier data network and the PSTN. The call server is an example of an entity in the address space of the carrier data network, and PSTN telephones are examples of entities in the address space of the PSTN. The example of the VPN gateway provides an interface to the call server, and to other entities of external networks. The VPN gateways are shared by a number of VPNs. As shown diagrammatically, each gateway can combine the functions of a router and a NAT, and possibly other functions. The PSTN trunks are connected indirectly to these gateways via the trunk gateways and media proxies as was the case in FIG. 2. The VPN gateway also provides an interface to the call server. This handles the signaling traffic passing between the call server 44 and the VPN data networking environment 30, by translating packet source and destination addresses, and by routing to or from the correct one of the VPNs. Hence, the VPN gateway can effectively combine two functions, an SDNAT (Source and Destination NAT) interface to the call server 44 on the carrier data network, to ensure privacy and security of the call server, and an interface for bearer traffic to and from the external networks. This gateway can include a number of virtual routers which feed packets to the NAT function of the gateway if they are signaling packets destined for the call server 44. Packets relating to the call once it is set up are routed via the media proxies for coupling to the PSTN 20. The virtual router is effectively in the address space of one of the VPNs. Other virtual routers are provided in the address spaces of other VPNs. Hence each VPN appears to have a dedicated call server, though it is actually a shared resource.

Other types of traffic from the VPNs can be handled as appropriate. For example, the external network resource can be a web server, video server, email server, VoIP telephony devices, etc.

Signaling and bearer packet flows for a VoIP call in the embodiment of FIG. 3 are shown by dotted lines. One dotted line shows a flow of signaling packets from the router 70 from the enterprise "blue" VPN site 40 through the VPN data network 30 to the shared gateway 100. From here they are sent by the virtual router of the gateway to the NAT component of the gateway and then over the carrier data network 27 (e.g. using standard IP routing) to the call server 44. More details of the sequence of signaling packets will be explained with reference to other figures below. Once the VoIP call has been set up using the signaling packets, the bearer packets carrying the voice information are transmitted as shown by the other dotted line in the figure. This extends from the router 70 of the "blue" VPN site 140 through the VPN data network 30 to the virtual router of the VPN gateway 100. This routes the bearer packets through the VPN gateway to the destination in the other common network resource via the carrier data network.

FIG. 4 Sequence Chart of Call Set up with VPN Identifier

FIG. 4 shows a sequence chart for a VoIP call setup in the arrangement shown in FIG. 3. In this sequence chart, succeeding time instances are represented by the downward direction in the chart. The four columns represent events or steps at four different entities in the arrangement. The left-hand column shows the functions of a line gateway 172 at one VPN site which is coupled to the destination of the call. The second column shows the functions of a line gateway 171 at a different VPN site which is coupled to the source of the call. The third column shows the functions of the shared VPN gateway 100, which includes a NAT function. The fourth column shows the functions of the call server 44.

The figure shows the IP addresses used in the headers of the packets sent between the entities. The letter S indicates the source address, and the letter D indicates the destination address. Letters A, Q, X and P represent variables. The letter after the colon indicates the UDP port. 10.x indicates a VPN address, and 47.x indicates a service provider address within the private network of the service provider. In this example, MGCP is used to communicate between the line gateway and the call server 44. MGCP is a well known standard, other alternatives can be conceived. At step 1, the line gateway 170 initiates a VoIP call setup by notifying the dialed digits of the call to the call server. The call server has a real IP address of 47.X:x in the external address which is mapped by the VPN gateway SDNAT function to an internal VPN address of 10.P:p. This address is routable within the VPN network to the VPN gateway. Therefore, the notification is routed by the VPN data network to the VPN gateway. At the VPN gateway, the virtual router passes it to the SDNAT component of the VPN gateway. The SDNAT component carries out an SDNAT operation at step 2 and passes the packet with the modified source and destination addresses to the call server 44. At step 3 the call server undertakes translations and determines an end destination for the call, in terms of which gateway the call should be sent to. At steps 4 and 5, an acknowledgement is returned by the call server toward the line gateway 170, in the form of a CRCX (create connection) packet. The SDNAT component has stored a correspondence or mapping, and therefore is able to reconvert the packet addresses to enable the packet to reach the originating line gateway 170.

Any call processing carried out by the call server (or by any external server) may be specific to each VPN, in which case the call server needs to know the identity of the VPN. It may be able to deduce this from the private address, or the VPN gateway can send an indication of the identity of the VPN.

At step 6 the originating line gateway sends a reply SDP (Session Description Protocol, IETF RFC 2327) to the call server 44 via the SDNAT component of the VPN gateway. At step 7 this is passed on by the VPN gateway. The SDP contains the VPN address selected by the originating line gateway to establish the voice communication. At steps 8 and 9, the call server responds by sending a create connection CRCX message to the destination, in this case the line gateway 172. The CRCX message includes the target VPN address of the originating line gateway that the destination line gateway should use to establish the voice communication. Steps 10 and 11 show the reply from the line gateway 172 back to the call server via the VPN gateway. This reply includes the VPN address selected by the destination line gateway to establish the voice communication. Steps 12 and 13 show the call server sending an MDCX (modify connection) message to the originating the line gateway 170 via the VPN gateway, including the VPN address for the destination line gateway. In response, the originating line gateway then starts sending voice packets in the form of an RTP (real time protocol, IETF RFC 3350) stream directly to the destination line gateway 172, using the VPN address it received in step 13 (step 14). Similarly, the destination line gateway sends voice packets using RTP to the originating line gateway (step 15) using the VPN address it received in step 9. The VoIP call is now established and bearer packets can be sent from the line gateway 170 to the destination line gateway 172.

FIG. 5 Sequence Chart of Web Access Via VPN

FIG. 5 shows a sequence chart for a web browser coupled to a VPN accessing a web server external to the VPN, via the VPN gateway. The web browser may be located at a VPN site such as site 40 of FIG. 3. The first column shows the actions of the web browser, the second column shows the actions of the VPN gateway, and the third column shows the actions of the web server on the external IP based network. At step 1, the web browser sends an HTTP Get message which is routed to the representation of the web server inside the VPN. As in previous example in FIG. 4, the web server external address of 47.Y:y is mapped to an internal VPN address of 10.W:w. Therefore the HTTP Get message gets routed to the VPN gateway. At step 2, this undergoes an address translation and is passed on to the external network by the VPN gateway, to be routed to the web server.

The web server finds the requested content information at step 3, and returns it to the browser at steps 4 and 5. Step 4 involves sending an HTTP 200 OK message containing the content information toward the VPN gateway. The gateway carries out the appropriate source and destination network address translation and sends on the message at step 5 to the web browser.

The translation of source and destination addresses can be of IP addresses or IP addresses with upper protocol port addresses (upper protocols: UDP, TCP, maybe others). Although shown with source and destination network address translation, this and other embodiments could be implemented with only conversion of VPN addresses of entities within the VPNs to addresses of the external network if desired, if hiding the external network addresses were not needed. The NAT can be arranged to provide protocol type conversion. This can enable the multiple VPNs and the external network to use different versions of the IP protocol.

FIG. 6 Embodiment of VPN Gateway Showing Components

FIG. 6 shows an embodiment of a VPN gateway 360. The figure also shows the VPNs and the call server which are coupled to the VPN gateway. Illustrated are a blue VPN site 40, a red VPN site 41 and a green VPN site 50. Each site has a router 70, voice switch 400 coupled to telephones 25 and to local computers 420. The system includes multiple virtual SDNATs 340 to translate VPN private addresses to or from the address of the call server in an external network (e.g. 47.X:x). The system includes a CP (control processor) 320, which comprises the routing logic and routing control for the numerous virtual routers VR 110 which can be instantiated as desired to route information internally and to/from the various VPNs. Such virtual routers are one way of implementing sharing of the gateway between many VPNs. VRs direct private addressed signaling traffic (e.g. MGCP) to the appropriate SDNAT. One VR is assigned per VPN and it exchanges routing information with the routing entities within the VPN. This routing information is then used to control the configuration of the forwarding engines FWD 330. The forwarding engines FWD 330 are shown implemented on one or multiple separate cards FR (Functional Router) 332, though other arrangements can be conceived. The FRs also provide the physical or logical interface ports to each of the VPNs, using any of various physical interfaces such as SONET or Ethernet and various logical interfaces such as ATM, Frame Relay, IP, to suit the application. The FWD 330 forwards the data packets from the various VPNs to the FP (Functional Processing) card 334 providing the actual SDNAT function. The FP card is coupled to the external network and through that to the call server 44.

The system can be implemented in software using conventional languages running on conventional hardware, with each of the parts implemented on cards coupled by a backplane, following conventional practice. There can be more than one of the VPN gateways coupled to each VPN, each of the VPN gateways being shared by two or more VPNs. Some or each of the systems 360 may have access to the Internet. External servers can have a variety of purposes. For example they can provide additional value added services to the calls such as video broadcast or streaming servers, voicemail servers or call center services, or announcement servers, a tone generators, or digit collectors for example. The servers can enable the service provider to provide VoIP centrex services. Other external servers can include a SIP (session initiation protocol) proxy, a web server, a storage server, a video server, a mail server, an H.323 gateway, a telephony client, and a telephony media gateway for example.

CONCLUDING REMARKS

As has been described above, a VPN gateway for interfacing two or more VPNs to external networks such as the internet or a PSTN having different addressing schemes, has a NAT shared by the VPNs for converting VPN addresses to addresses of the external network. An advantage of this is reduced number of additional network elements, e.g. boxes, and fewer additional addresses, and for software implementations there can be a reduction in the number of software modules and thus lower memory requirements and reduced complexity. The NAT can be a source and destination NAT, arranged such that entities in the external networks appear to have an address within an address range of the respective VPN. Thus, entities in the external resource can appear as trusted resources inside the VPN. Although the examples illustrated show a communication session in the form of a VoIP call, or web access, clearly other types of communication session can be carried. Other variations will be apparent to those skilled in the art, having corresponding advantages to those set out above, within the scope of the claims.

The invention claimed is:

1. Virtual private network (VPN) gateway apparatus comprising a control processor to interface two or more virtual private networks (VPNs) to one or more external networks, the external network or networks having a different addressing scheme or schemes to those of the VPNs, the VPN gateway apparatus having a network address translator (NAT) shared by the VPNs, the NAT comprising a source and destination NAT, to convert VPN addresses of entities within the VPNs to addresses of the external network and to convert addresses of entities in the external network to internal addresses within an address range of a respective VPN wherein entities in the external networks appear to one of the VPNs to have an address within an address range of the respective VPN, the NAT being arranged to modify source and destination addresses for outgoing packets and pass the packets to an entity in the external network and to reconvert the modified addresses for incoming packets received in response.

2. The VPN gateway apparatus of claim 1, the entities in the external networks comprising at least one of: a call server, a SIP proxy, a web server, a storage server, a video server, a mail server, an H.323 gateway, a telephony client, or a telephony media gateway.

3. The VPN gateway apparatus of claim 1, the external network address used for each VPN entity being unique in the corresponding external network.

4. The VPN gateway apparatus of claim 1 having one or more physical or logical interface ports, and being arranged to determine an identity of each of the VPNs based on which one or more physical or logical interface port on the VPN gateway is used to couple the respective VPN.

5. The VPN gateway apparatus of claim 1, the VPNs each comprising a part of an Internet Protocol (IP) network.

6. The VPN gateway apparatus of claim 5 where the multiple VPNs use overlapping private IP addressing schemes.

7. The VPN gateway apparatus of claim 5, being arranged to provide protocol conversion.

8. The VPN gateway apparatus of claim 1, the VPNs being arranged to use at least one of ATM, Frame Relay, MPLS or IP.

9. The VPN gateway apparatus of claim 1 arranged to couple communication sessions having one end in one of the VPNs and another end in the external network, the sessions being controlled by a server.

10. The VPN gateway apparatus of claim 9, the communication sessions being one of data sessions, telephony calls, or video calls.

11. The VPN gateway apparatus of claim 9, arranged to communicate to the external network entities the VPN identity associated with a given communication session.

12. A method of operating virtual private network (VPN) gateway apparatus, the method comprising: interfacing two or more VPNs to one or more external networks, the external network or networks having different addressing schemes to those of the VPNs, the VPN gateway apparatus having a network address translator (NAT) shared by the VPNs, the NAT comprising a source and destination NAT, to convert VPN addresses of entities within the VPNs to addresses of the external network and to convert addresses of entities in the external network to internal addresses within an address range of a respective VPN, using the VPN gateway apparatus to pass information between the two or more VPNs and the one or more external networks, including modifying source and destination addresses for outgoing packets and passing the packets to an entity in the external network and reconverting the modified addresses for incoming packets received in response wherein entities in the external networks appear to one of the VPNs to have an address within an address range of the respective VPN.

* * * * *